(12) United States Patent
Steele et al.

(10) Patent No.: US 11,263,327 B2
(45) Date of Patent: *Mar. 1, 2022

(54) SYSTEM FOR INFORMATION SECURITY THREAT ASSESSMENT AND EVENT TRIGGERING

(71) Applicant: BANK OF AMERICA CORPORATION, Charlotte, NC (US)

(72) Inventors: David Michael Steele, Carrollton, TX (US); Robert James Gray, Southlake, TX (US); Cory David Brunner, Stanley, NC (US); Jason Dean Vaughn, Jacksonville, FL (US); Ryan Joseph Argomaniz, Sachse, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 36 days.

This patent is subject to a terminal disclaimer.

(21) Appl. No.: 16/777,505

(22) Filed: Jan. 30, 2020

(65) Prior Publication Data

US 2020/0167481 A1    May 28, 2020

Related U.S. Application Data

(63) Continuation of application No. 15/827,034, filed on Nov. 30, 2017, now Pat. No. 10,607,013.

(51) Int. Cl.
*G06F 21/57* (2013.01)
*H04L 29/06* (2006.01)

(52) U.S. Cl.
CPC ............ *G06F 21/577* (2013.01); *H04L 63/10* (2013.01); *H04L 63/1425* (2013.01); (Continued)

(58) Field of Classification Search
CPC . H04L 63/14; H04L 63/1408; H04L 63/1425; H04L 63/1433; H04L 63/10; H04L 63/08; H04L 63/1441; H04L 63/20; G06F 21/50; G06F 21/577; G06F 21/6245; G06F 21/62; G06F 21/60
See application file for complete search history.

(56) References Cited

U.S. PATENT DOCUMENTS

6,925,443 B1    8/2005 Baggett, Jr. et al.
7,089,428 B2    8/2006 Farley et al.
(Continued)

*Primary Examiner* — Kristine L Kincaid
*Assistant Examiner* — Shaqueal D Wade-Wright
(74) *Attorney, Agent, or Firm* — Moore & Van Allen PLLC; James C. Edwards (57) ABSTRACT

A system for generating entity-specific security-related inquiries and determining a frequency for invoking the inquiries based on integration of external security-related data and internal security related data. Specifically, a security threat level is determined for an entity and the components which comprise the security threat are identified. The components signify areas of focus for generating the entity-specific security-related inquiries. In further embodiments of the invention analytics are implemented to logically analyze the external security-related data and internal security related data and the results of which further refine the generation of the entity-specific security-related inquiries and/or determination of the frequency for invoking the inquiries.

19 Claims, 5 Drawing Sheets

(52) U.S. Cl.
CPC ...... *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 7,290,275 B2 | 10/2007 | Baudoin et al. | |
| 7,552,480 B1 | 6/2009 | Voss | |
| 8,392,431 B1 | 3/2013 | Agassy et al. | |
| 8,725,597 B2 | 5/2014 | Mauseth et al. | |
| 8,744,894 B2 | 6/2014 | Christiansen et al. | |
| 8,752,170 B1 | 6/2014 | Newstadt et al. | |
| 9,230,066 B1 | 1/2016 | Bailey et al. | |
| 9,230,280 B1 | 1/2016 | Maag et al. | |
| 9,275,291 B2 | 3/2016 | Shulman et al. | |
| 9,282,092 B1 | 3/2016 | Shankar et al. | |
| 9,319,419 B2 | 4/2016 | Sprague et al. | |
| 9,578,043 B2 | 2/2017 | Mawji et al. | |
| 9,679,254 B1 | 6/2017 | Mawji et al. | |
| 9,699,209 B2 | 7/2017 | Ng et al. | |
| 9,721,296 B1 | 8/2017 | Chrapko | |
| 9,813,402 B1* | 11/2017 | Chen | G06F 21/316 |
| 2004/0193907 A1* | 9/2004 | Patanella | G06Q 10/10 726/25 |
| 2005/0066195 A1 | 3/2005 | Jones | |
| 2006/0031938 A1 | 2/2006 | Choi | |
| 2006/0265746 A1 | 11/2006 | Farley et al. | |
| 2009/0024663 A1 | 1/2009 | McGovern | |
| 2009/0328186 A1 | 12/2009 | Pollutro et al. | |
| 2013/0019148 A1* | 1/2013 | Lee | G06F 40/131 715/202 |
| 2013/0104236 A1 | 4/2013 | Ray et al. | |
| 2013/0304761 A1 | 11/2013 | Redlich et al. | |
| 2013/0318580 A1 | 11/2013 | Gudlavenkatasiva et al. | |
| 2014/0259130 A1 | 9/2014 | Li et al. | |
| 2015/0195301 A1* | 7/2015 | Bhargav-Spantzel | G06F 21/552 726/22 |
| 2015/0242619 A1 | 8/2015 | Bender et al. | |
| 2015/0288712 A1* | 10/2015 | Jones | G06F 21/577 726/25 |
| 2016/0308890 A1* | 10/2016 | Weilbacher | H04L 63/1433 |
| 2016/0371698 A1 | 12/2016 | Adler et al. | |
| 2016/0381560 A1 | 12/2016 | Margaliot | |
| 2017/0140312 A1 | 5/2017 | Pai et al. | |
| 2017/0324768 A1 | 11/2017 | Crabtree et al. | |
| 2017/0346846 A1 | 11/2017 | Findlay | |
| 2018/0375877 A1 | 12/2018 | Jakobsson et al. | |
| 2019/0166154 A1 | 5/2019 | Steele et al. | |

\* cited by examiner

SYSTEM FOR INFORMATION SECURITY THREAT ASSESSMENT AND EVENT TRIGGERING

CROSS-REFERENCE TO RELATED APPLICATION

This application is a continuation of and claims priority from allowed, co-pending U.S. patent application Ser. No. 15/827,034, filed on Nov. 30, 2017 and entitled "System for Information Security Threat Assessment and Event Triggering".

FIELD OF THE INVENTION

The present invention is generally directed to information security and, more specifically, collaborate security-related data from publicly-accessible external data sources and privately-accessible internal data sources to determine a set of security-related inquiries requiring input parameters and the frequency for presenting the inquiries.

BACKGROUND

Typically, the assessment of entities typically occurs via a static set of inquiries regardless of the security threat posed by the entity being queried. In this regard, in many instances the same set of inquiries are invoked for all entities requiring information security threat assessment regardless of the level of security threat posed by the entity, the type of entity, the volume of data exposed to the entity, the type of applications provided by or hosted by the entity or the like. In addition, the frequency at which inquiries are invoked typically occurs at the same rate for all entities regardless of the level of security threat posed by the entity, as well as, the various other aforementioned factors.

Therefore, a need exists to logically and analytically determine an entity-specific set of inquiries requiring input parameters and an entity-specific frequency for invoking the set of inquiries. The determination of the entity-specific set of inquiries and the frequency for invoking the set of inquiries should take into account the information security threat level posed by the entity, as well as, other entity-related factors, such as, the type of entity, the volume of data exposed to the entity, the type of applications provided by or hosted by the entity or the like.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods directed to generating a set of entity-specific security-related inquiries and determining the frequency for presenting the inquiries based at least on both external data (i.e., publicly accessible) and internal data (i.e., privately accessible). As such, according to embodiments herein described in detail below, a set of inquiries are generated that are specific to the entity, such that, inquiries can be tailored for an entity based on the entity's security threat level (i.e. likelihood of occurrence of a security event and/or likely loss from occurrence of a security threat), as well as, other factors, such as type of entity, types of applications provided by hosted by the entity, volume of applications provided by or hosted by the entity and the like.

In specific embodiments of the invention, the external data and the internal data are correlated to determine a security threat level for the entity that indicates a likelihood of an occurrence of a security event and/or a likely loss from an occurrence of a security threat. In such embodiments of the invention, the entity-specific security-related inquiries are generated based on the security threat level and/or the frequency for presenting the inquiries to the entity is determined based on the security threat level. In specific embodiments of the invention, the determination of the security threat level triggers generating the entity-specific security-related inquiries and/or determining the frequency for presenting the inquiries to the entity. In other specific embodiments of the invention generating the set of inquiries includes identifying security components of the security threat level, identifying security-related inquiries associated with the security component and including the identified security-related inquiries in the set of inquiries.

In other specific embodiments of the invention, security-related analytics are used, such that, logic is applied to the external and internal data to identify one or more security-related data patterns associated with the entity. In such embodiments of the invention, the security-related data patterns are used as a basis for generating the set of inquiries and/or determining the frequency for presenting the inquiries to the entity.

The following provides a brief summary of claimed embodiments on the invention. This summary should be construed as limiting the embodiments of the invention, in that, other embodiments of the invention are herein considered which have not been claimed in the time of filing this application.

A system for determining security-related inquiries and inquiry frequency defines first embodiments of the invention. The system includes a computer platform (i.e., one or more computing devices and/or apparatus) having a memory and at least processor in communication with the processor. The system additionally includes an external data retrieval module that is stored in the memory and executable by the processor. The external data retrieval module is configured to retrieve, from one or more external data sources via a publicly-accessible portion of a distributed computing network, security-related external data associated with an entity (e.g., a third-party entity of an enterprise, such as a vendor, supplier, contractor or the like). Additionally, the system includes an internal data reception module that is stored in the memory and executable by the processor. The internal data reception module is configured to receive, from one or more internal data sources via a privately-accessible portion of the distributed computing network, security-related internal data associated with an entity.

The system further includes an inquiry generator module that is stored in the memory and executable by the processor. The inquiry generator module is configured to generate a plurality of security-related inquiries requesting input parameters. The plurality of inquiries are generated specific to the entity based at least on the security-related external data and the security-related internal data. Additionally, the system includes an inquiry frequency determination module that is stored in the memory and executable by the processor. The inquiry frequency determiner is configured to determine a frequency for invoking the plurality of inquiries to the entity based at least on the security-related external data and the security-related internal data.

In specific embodiments the system further comprises an inquiry platform module that is stored in the memory and executable by the processor. The inquiry platform module is present, via the publicly-accessible portion of the distributed computing network, the plurality of security-related inquiries to the entity, request the input parameters for the plurality of security-related inquiries, and receive, via the publicly-accessible portion distributed computing network, the input parameters from the entity.

In further specific embodiments of the system, the inquiry generator module is further configured to generate the plurality of security-related inquiries dynamically (i.e., real-time or near real-time) in response to the external data retrieval module and the internal data reception module dynamically (i.e., real-time or near real-time) retrieving and receiving the security-related external data and the security-related internal data in response to updates in one or more of the external data sources or one or more of the internal data sources. In such embodiments of the system, the inquiry platform is further configured to dynamically present (i.e., real-time or near real-time) the plurality of security-related inquiries to the entity in response to dynamically generating the plurality of security-related inquiries.

In other specific embodiments of the system, the inquiry generator module is further configured to determine one or more security areas of focus based on the security-related external data and the security-related internal data and generate the plurality of security-related inquiries based further on the one or security area of focus.

In additional embodiments, the system includes a security threat level determination module that is stored in the memory and executable by the processor. The security threat level determination module is configured to determine a security threat level for the entity based on the security-related external data and the security-related internal data. The security threat level indicating at least one a likelihood of an occurrence of a security event or a likely loss associated with the occurrence of a security event. In such embodiments of the system, the inquiry generator module is triggered to generate the plurality of security-related inquiries based on the security threat level determination module determining the security threat level. In such embodiments of the system, the inquiry generator module is further configured to determine the plurality of security-related inquiries by identifying security components of the security threat level, identifying inquiries that are associated with security components and including the identified inquiries in the plurality of security-related inquiries. In other related embodiments of the system, the inquiry frequency determination module is triggered to assess the frequency for presenting the plurality of security-related inquiries based on the security threat level determination module determining the security threat level.

In other specific embodiments the system includes a security analytics module that is stored in the memory and executable by the processor. The security analytics module is configured to apply logic to the security-related external data and the security-related internal data to identify one or more security related data patterns associated with the entity. In such embodiments of the system, the inquiry generator module is further configured to generate the plurality of security-related inquiries specific to the entity based further on the one or more security-related data patterns associated with the entity.

In specific embodiments of the system, the security-related external data associated with the entity comprises at least public open source intelligence data. Additionally, the security-related internal data associated with the entity may include at least one of (i) assessment results, (ii) application scan results, and (iii) incident management results.

Moreover, in further embodiments of the system, the inquiry generator module is further configured to generate the plurality of security-related inquiries specific to the entity based further on at least one of entity type, product or service type providing by the entity, type of data hosted by the entity, amount of data hosted by the entity, volume of applications hosted by the entity and the like. In similar embodiments of the system, the inquiry frequency determination module is further configured to determine the frequency for presenting the plurality of security-related inquiries to the entity based further on at least one of entity type, product or service type providing by the entity, type of data hosted by the entity, amount of data hosted by the entity, volume of applications hosted by the entity.

A computer processor-implemented method for determining security-related inquiries and inquiry frequency determines second embodiments of the invention. The method includes retrieving, from one or more external data sources via a publicly-accessible portion of a distributed computing network, security-related external data associated with the entity and receiving, from one or more internal data sources via a privately-accessible portion of the distributed computing network, security-related internal data associated with the entity. The method further includes generating, by a computing device processor, a plurality of security-related inquiries requesting input parameters. The plurality of inquiries are generated specific to the entity based at least on the security-related external data and the security-related internal data. Additionally, the method includes determining, by a computing device processor, a frequency for invoking the plurality of inquiries based at least on the security-related external data and the security-related internal data.

In further specific of the method, generating further includes dynamically generating the plurality of security-related inquiries in response to the external data retrieval module and the internal data reception module dynamically retrieving and receiving the security-related external data and the security-related internal data in response to updates in one or more of the external data sources or one or more of the internal data sources.

In other specific embodiments the method includes determining, by a computing device processor, one or more security areas of focus based on the security-related external data and the security-related internal data and wherein generating further comprises generating the plurality of security-related inquiries based further on the one or security area of focus.

A computer program product including a non-transitory computer-readable medium defines third embodiments of the invention. The computer-readable medium includes codes for causing a computing device processor to retrieve, from one or more external data sources via a publicly-accessible portion of a distributed computing network, security-related external data associated with the entity and receive, from one or more internal data sources via a privately-accessible portion of the distributed computing network, security-related internal data associated with the entity. The computer-readable medium additionally includes codes for causing a computing device processor to generate a plurality of security-related inquiries requesting input parameters. The plurality of inquiries are generated specific to the entity based at least on the security-related external data and the security-related internal data. In addition, the computer-readable medium additionally includes codes for causing a computing device processor to determine a frequency for invoking the plurality of inquiries based at least on the security-related external data and the security-related internal data.

Thus, according to embodiments of the invention, which will be discussed in greater detail below, the present invention provides for generating a set of entity-specific security-related inquiries and determining the frequency for presenting the inquiries to the entity based at least on both external data and internal data. As such, according to embodiments herein described in detail below, a set of inquiries are generated that are specific to the entity, such that, inquiries can be tailored for an entity based on the entity's security threat level (i.e., likelihood of occurrence of a security event and/or likely loss from occurrence of a security threat), as well as, other factors, such as type of entity, types of applications provided by hosted by the entity, volume of applications provided by or hosted by the entity and the like.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, systems, methods and the like are provided for generating a set of entity-specific security-related inquiries and determining the frequency for presenting the inquiries to the entity based at least on integrating both external data and internal data. As such, a set of inquiries are generated that are specific to the entity/third-party, such that, inquiries can be tailored for an entity/third-party based on the entity's security threat level (i.e. likelihood of occurrence of a security event and/or likely loss from occurrence of a security threat), as well as, other factors, such as, but not limited to, type of entity, types of applications/services provided by hosted by the entity, volume of applications/services provided by or hosted by the entity and the like.

In specific embodiments of the invention, the external data and the internal data are integrated to determine a security threat level for the entity that indicates a likelihood of an occurrence of a security event and/or a likely loss from an occurrence of a security threat. In such embodiments of the invention, the entity-specific security-related inquiries are generated based on the security threat level and/or the frequency for presenting the set of inquiries to the entity is determined based on the security threat level. In specific embodiments of the invention, the determination of the security threat level triggers generating the entity-specific security-related inquiries and/or determining the frequency. In other specific embodiments of the invention generating the set of inquiries includes identifying security components (i.e., areas of focus) within the security threat level, identifying security-related inquiries associated with the security component and including the identified security-related inquiries in the set of inquiries.

In other specific embodiments of the invention, security-related analytics are used, such that, logic is applied to the external and internal data to identify one or more security-related data patterns associated with the entity. In such embodiments of the invention, the security-related data patterns are used as a basis for generating the set of inquiries and/or determining the frequency.

Figure 1:
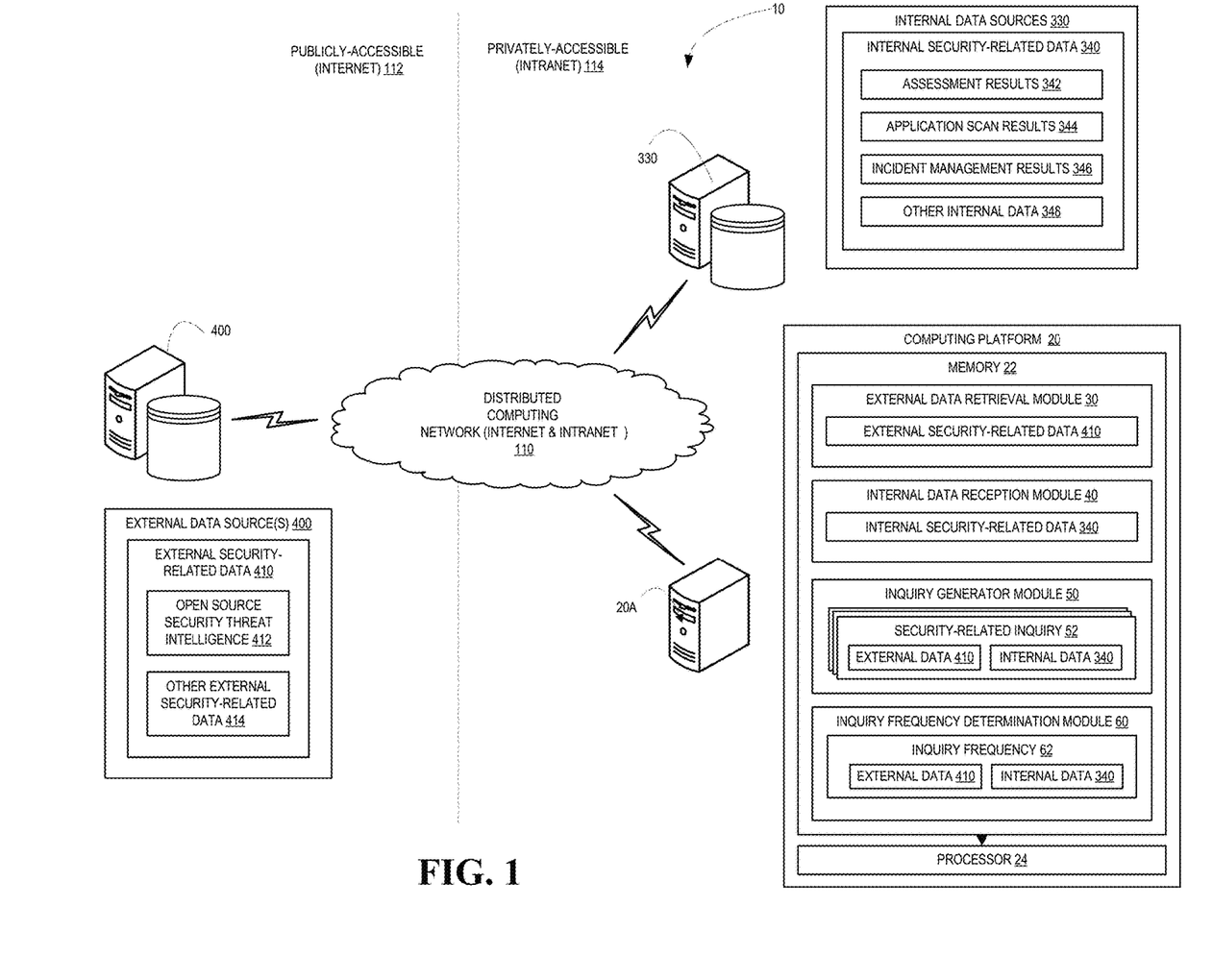
FIG. 1 provides a schematic diagram of a system for generating entity-specific security-related inquiries and determining the frequency for invoking the inquiries, in accordance with embodiments of the invention.

Referring to FIG. 1 a schematic diagram is provided of a system 10 for generating entity-specific security-related inquiries and determining the frequency for invoking such inquiries, in accordance with embodiments of the present invention. The system 10 is implemented in a distributed computing network 110 that includes both a publicly-accessible portion 112, such as the Internet and a privately-accessible portion 114, such as one or more intranets.

The system includes a computing platform 20 having a memory 22 and at least one processor 24 in communication with the memory 22. The computing platform resides within one and typically a plurality of computing devices and/or apparatus, such as server(s) 20A, storage devices and the like.

Memory 22 of computing platform 20 stores external data retrieval module 30 that is configured to retrieve, via the publicly-accessible portion 112 of the distributed computing network 110, external security-related data 410 from one or more external data sources 400. The module 30 may retrieve the data 410 on a predetermined schedule or may be triggered to retrieve the data based on the need for generating inquiries, determining frequency, determining a security threat level and/or performing analytical analysis. In other embodiments of the invention, module 30 may be configured to receive data feeds from external data source(s) 400 on a regular schedule or dynamically as data is updated. External security-related data 410 is associated with entities, otherwise referred to herein as third-parties, such as, but not limited to, suppliers, vendors, contractors, data hosts, application hosts, any entity that provides a good or service to an enterprise and the like. In specific embodiments of the invention, the external security related data includes open source security threat intelligence 412, and other external security-related data 414, such as, but not limited to, cloud threat data and the like.

Memory 22 of computing platform 20 additionally stores internal data reception module 40 that is configured to receive, via the privately-accessible portion 114 of the distributed computing network 110, internal security-related data 340 from one or more internal data sources 330. The module 40 may be configured to receive the data 340 periodically, such on a predetermined schedule or dynamically, in response to data 340 being updated. In other configurations, module 40 may be configured to retrieve the data 340 on a predetermined schedule or may be triggered to retrieve the data based on the need for generating inquiries, determining frequency, determining a security threat level and/or performing analytical analysis. Internal security-related data 340 is associated with entities, otherwise referred to herein as third-parties, such as, but not limited to, suppliers, vendors, contractors, data hosts, application hosts, any entity that provides a good or service to an enterprise and the like. In specific embodiments of the invention, the internal security related data includes, but is not limited to, assessment results 342 (e.g., entity self-assessment results, online/questionnaire results, physical audit results and the like), application scan results 344, security incident/event management results 346 and any other internal security-related data associated with the entities/third-parties.

Further, system 10 includes inquiry generator module 50, which is stored in the memory 22 of computing platform 20 and is executable by the one or more processors 24. Inquiry generator module 50 is configured to generate a plurality of entity-specific security-related inquiries requiring input parameters (i.e., responses) by the entity/third-party. The plurality of inquiries are based at least on the internal security-related data 340 and the external security-related data 410 associated with the entity/third-party. In specific embodiments of the invention, a set of inquiries are predetermined and the entity-specific inquiries are generated/selected based on which inquiries are determined to be associated with the internal security-related data 340 and the external security-related data 410.

Additionally, system 10 includes inquiry frequency determination module 60 that is stored in memory 22 of computing platform 20 and executable by the one or more processors 24. Module 60 is configured to determine a frequency/rate (daily, weekly, monthly, annually and the like) for invoking the generated inquiries on the entity/third party based at least on the internal security-related data 340 and the external security-related data 410.

Figure 2:
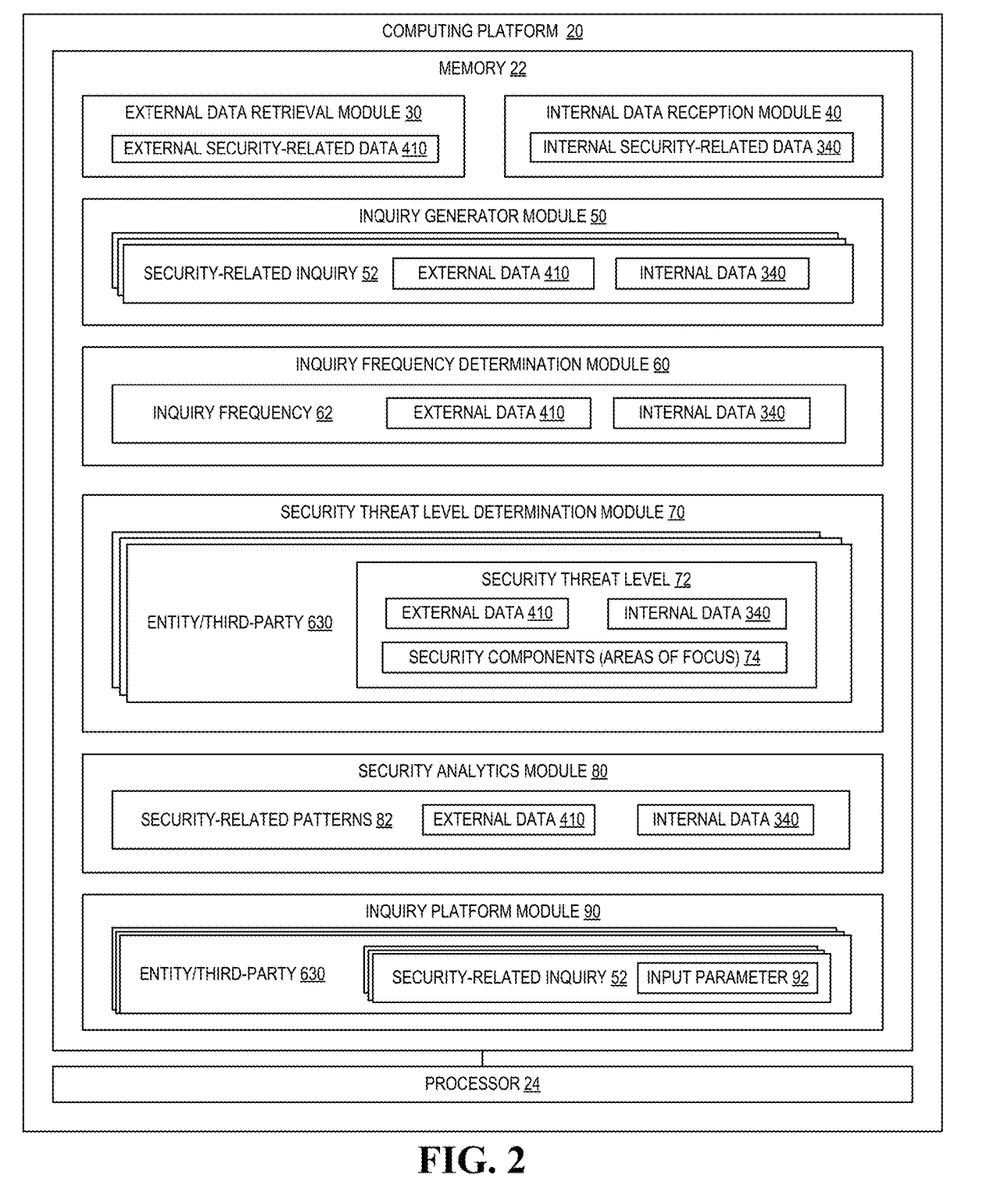
FIG. 2 provides block diagram of a computing platform for generating entity-specific security-related inquiries and determining the frequency for invoking the inquiries, in accordance with alternate embodiments of the invention.

Referring to FIG. 2 a block diagram is provided of computing platform 20, in accordance with specific embodiments of the invention. In addition to providing more details, FIG. 2 provides various optional embodiments of the system. The computing platform 20, which, as previously discussed, may comprise one or more apparatus, devices is configured to execute algorithms, such as modules, routines, applications and the like. Computing platform 20 includes memory 22, which may comprise volatile and non-volatile memory, such as read-only and/or random-access memory (RAM and ROM), EPROM, EEPROM, flash cards, or any memory common to computer platforms). Moreover, memory 22 may comprise cloud storage, such as provided by a cloud storage service and/or a cloud connection service.

Further, computing platform 20 also includes processor 24, which may be an application-specific integrated circuit ("ASIC"), or other chipset, logic circuit, or other data processing device. Processor 24 may execute an application programming interface ("API") (shown in FIG. 5) that interfaces with any resident programs, such as external data retrieval module 30, internal data reception module 40, inquiry generator module 50, inquiry frequency determination module 60, security threat level determination module 70, security analytics module 80, inquiry platform module 90 or the like stored in the memory 22 of the computing platform 20.

Processor 23 may include various processing subsystems (not shown in FIG. 2) embodied in hardware, firmware, software, and combinations thereof, that enable the functionality of the computing platform 20 and the operability of the computing platform 20 on the distributed computing network 110 (shown in FIG. 1). For example, processing subsystems allow for initiating and maintaining communications and exchanging data with other networked devices. For the disclosed aspects, processing subsystems of processor 24 may include any subsystem used in conjunction with external data retrieval module 30, internal data reception module 40, inquiry generator module 50, inquiry frequency determination module 60, security threat level determination module 70, security analytics module 80, inquiry platform module 90 and related sub-routines, algorithms, sub-algorithms, modules, sub-modules thereof.

Figure 4:
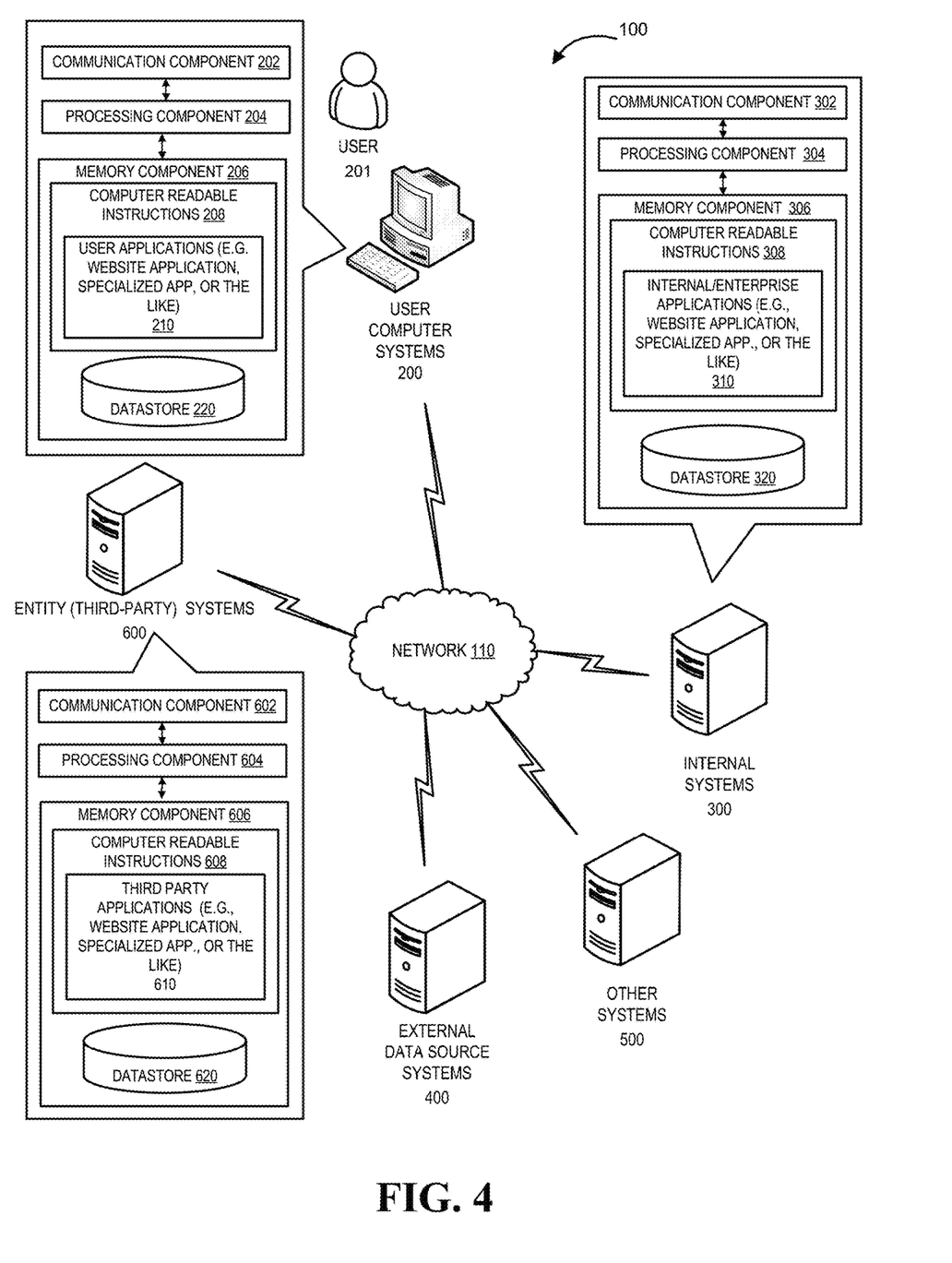
FIG. 4 illustrates a block diagram of a threat assessment and analytics system environment, in accordance with embodiments of the invention.

Computer platform 120 may additionally include a communications module (not shown in FIG. 2) embodied in hardware, firmware, software, and combinations thereof, that enables electronic communications between the computing platform 20 and other platforms, systems, apparatus and/or devices (shown in FIGS. 1 and 4). Thus, communication module may include the requisite hardware, firmware, software and/or combinations thereof for establishing and maintaining a network communication connection.

As previously discussed in relation to FIG. 1, memory 22 of computing platform 20 stores external data retrieval module 30 and internal data reception module 40 that are configured to retrieve and/or receive corresponding external and internal security data 410 and 340 associated with an entity/third-party from one or more external and internal data sources 400 and 330 (shown in FIG. 1). While external data retrieval module 30 and internal data reception module 40 are shown and described as two separate modules, in other embodiments of the invention, a single module may be implemented to retrieve/receive both internal and external data 410 and 330.

Additionally, memory 22 of computing platform 20 stores inquiry generator module 50 that is configured to generate a plurality of entity-specific security-related inquiries 52 based at least on the internal data 340 and the external data 410. In specific embodiments of the invention, the inquiries 52 may be generated based on other factors, such as, but not limited to, entity/third-party category/type, product or service providing by the entity/third party, type of data hosted by the entity/third-party, amount of data hosted by the entity/third-party, volume of applications hosted by the entity/third-party and the like. In specific embodiments of the invention, the plurality of inquiries 52 are generated dynamically, in real-time or near real-time response to updates of the internal data 340 and/or external data 410. In such embodiments of the invention, updates to the internal data 340 and/or external data 410 trigger retrieval and/or receipt of the internal data 340 and/or external data 410 by the corresponding modules 30, 40 for the purpose of providing dynamic generation of the inquiries 52.

In specific embodiments of the invention, memory 22 of computing platform 20 stores security threat level determination module 70 that is executable by the one or more processors 24. Module 70 is configured to determine a security threat level 72 for each of the entities/third-parties that are associated with the enterprise based on the external data 410 and the internal data 340. The security threat level 72, which may be a numeric score or the like, provides an indication as the likelihood of occurrence of a security incident/event and/or the likely loss that would occur from the occurrence of a security incident/event. In such embodiments of the invention, module 50 may generate the plurality of entity-specific security-related inquiries 52 based on the security threat level 72. In specific embodiments of the invention, module 50 may determine security components (i.e., areas of focus) that comprise the security threat level 72. Once the security components are identified, one or more inquiries are identified that are associated with the security components and, such inquiries are included within the plurality of inquiries. In other specific embodiments of the invention, determination of a security threat level 72 is a trigger for generating the plurality of inquiries 52, such that, inquiries 52 are automatically generated and/or modified in response to determination of the security threat level 72.

In still further specific embodiments of the invention, memory 22 of computing platform 20 stores security analytics module 80 that is executable by the one or more processors 24. Module 80 is configured to logically analyze the internal data 340 and external data 410 to identified security data patterns 82 and/or trends. In such embodiments of the invention, module 50 may generate the plurality of entity-specific security-related inquiries 52 based further on the security data patterns 82 and/or trends. The security patterns 82 and/or trends may be associated with the entity/third-party and/or a category of entities/third-parties. In other specific embodiments of the invention, determination of a security data pattern 82 is a trigger for generating the plurality of inquiries 52, such that, inquiries 52 are automatically generated and/or modified in response to determination of the security data pattern 82.

Additionally, memory 22 of computing platform 20 stores inquiry frequency determination module 60 that is configured to determine a frequency/rate 62 for invoking the generated inquiries on the entity/third-party based at least on the internal data 340 and the external data 410. In specific embodiments of the invention, the inquiry frequency 62 may be generated based on other factors, such as, but not limited to, entity/third-party category/type, product or service providing by the entity/third party, type of data hosted by the entity/third-party, amount of data hosted by the entity/third-party, volume of applications hosted by the entity/third-party and the like. In specific embodiments of the invention, the inquiry frequency 62 may be based on the security threat level 72 determined by module 70 and/or the security data patterns 82 and/or trends determined by module 80.

Moreover, computing platform 20 may include inquiry platform module 90 that is stored in memory 22 and executable by the one or more processors 24. Inquiry platform module 90 is configured to present or otherwise transmit the plurality of inquiries 52 to the associated entity/third party 630 and, in response to the entity/third-party responding to the inquiries, receiving input parameters 92 for the plurality of inquiries 52.

Figure 3:
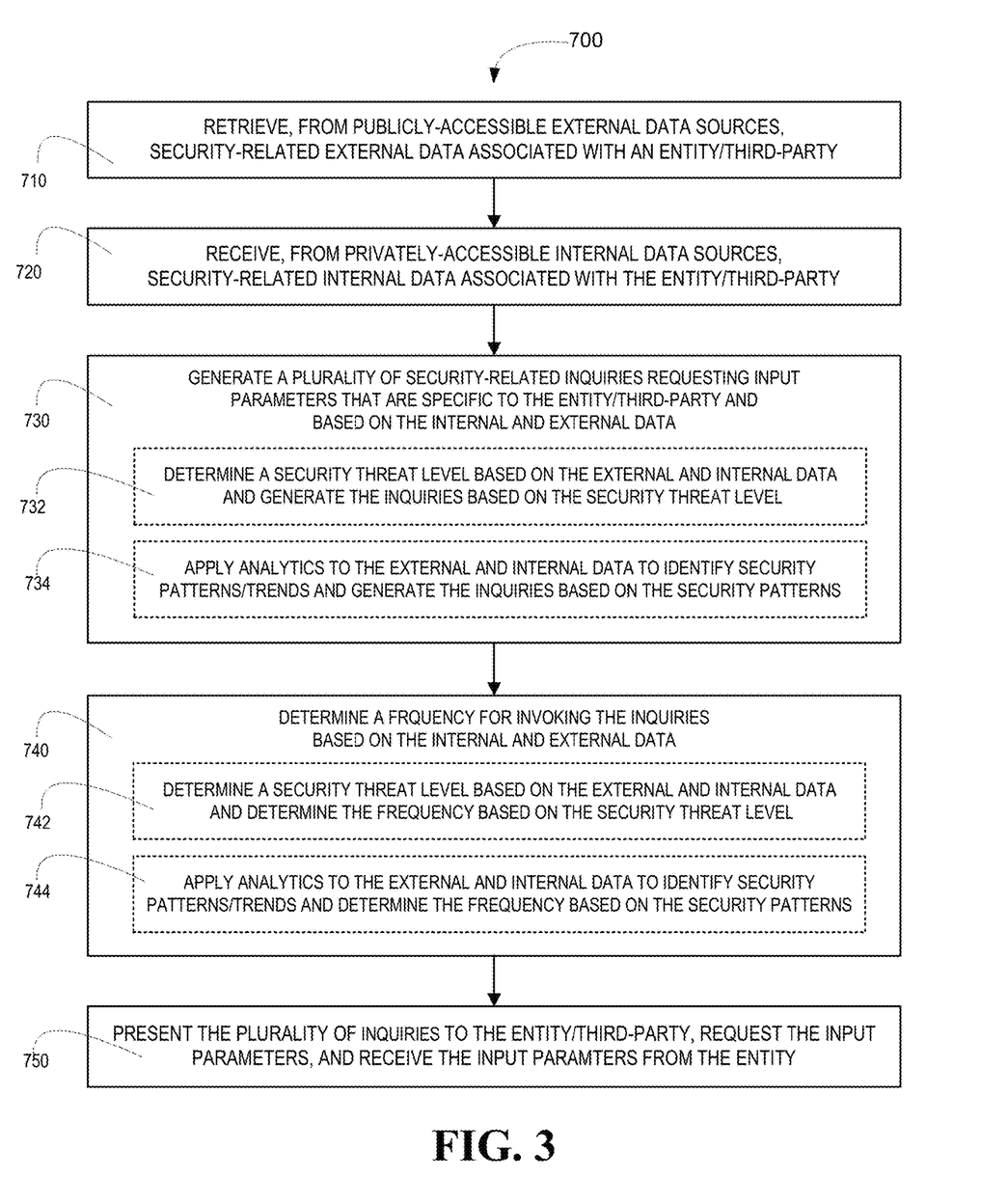
FIG. 3 provides a flow diagram of a method for generating entity-specific security-related inquiries and determining the frequency for invoking the inquiries, in accordance with embodiments of the invention.

Referring to FIG. 3, a flow diagram is presented of a method 700 for generating entity-specific security-related inquiries and determining the frequency for invoking the inquiries, in accordance with embodiments of the invention. At Event 710, security-related external data associated with an entity/third-party is retrieved or otherwise received from publicly-accessible external data sources. Such external data may include, but is not limited to, open source threat data, cloud threat data, threat intelligence data and the like.

At Event 720, security-related internal data associated with an entity/third-party is retrieved or otherwise received from privately-accessible internal data sources. Such internal data may include, but is not limited to, incident management data, application scan result data, product data, assessment data and the like. Event 720 and 730 may occur on a scheduled basis or dynamically based on updating data at the external and/or internal data sources.

At Event 730, a plurality of entity-specific security-related inquiries requiring input parameters are generated based at least on the internal data and the external data associated with the entity/third-party. In specific embodiments of the invention, the inquiries are further generated based further on the type/category of the entity, the type of products/services provided by the entity, the type of applications hosted by the entity, the volume of products/services provided by the entity, the volume of applications hosted by the entity and the like. At optional Sub-Event 732, a security threat level is determined for the entity based at least on the internal and external data and the security threat level is the basis for generating the entity-specific security related inquiries. In such embodiments of the invention, the security threat level is indicative of at least one of the likelihood of occurrence of security incident/event and/or the likely loss from an occurrence of a security incident/event. In further specific embodiments, the security threat level is analyzed to determine security components (i.e., areas of focus) that contribute to the security threat level, inquiries are identified that are associated with the security component(s) and included in the plurality of inquiries. At optional Sub-Event 734, analytics are applied to external data and internal data associated with the entity or multiple entities (e.g., category of entities/third-parties) to determine security patterns and or trends. In such embodiments of the invention, the determined security patterns and/or trends are one basis for generating the plurality of inquiries.

At Event 740, a frequency for invoking the inquiries is determined based at least on the internal data and the external data associated with the entity/third-party. In specific embodiments of the invention, the frequency/rate at which the inquiries are invoked (i.e., presented to the entity/third-party for requisite input parameters) are based further on the type/category of the entity, the type of products/services provided by the entity, the type of applications hosted by the entity, the volume of products/services provided by the entity, the volume of applications hosted by the entity and the like. At optional Sub-Event 742, a security threat level is determined for the entity based at least on the internal and external data and the security threat level is the basis for determining the frequency for invoking the inquiries. In further specific embodiments, the security threat level is analyzed to determine security components (i.e., areas of focus) that contribute to the security threat level, inquiries are identified that are associated with the security component(s) and included in the plurality of inquiries. At optional Sub-Event 734, analytics are applied to external data and internal data associated with the entity or multiple entities (e.g., category of entities/third-parties) to determine security patterns and or trends. In such embodiments of the invention, the determined security patterns and/or trends are a basis for determining the frequency for invoking the inquiries.

At optional Event 750, based on the determined frequency, the inquiries are presented to the entity/third-party and input parameters are requested. Such presentation may include electronically communicating the plurality of inquiries to the entity/third-party and/or posting the inquiries to an entity-accessible web portal. In response, to the entity providing the requisite input parameters from the entity, the input parameters are received by the inquiry=requesting entity (e.g., enterprise or the like).

FIG. 4 illustrates a security threat level and analytics system 1, in accordance with embodiments of the invention. As illustrated in FIG. 4, one or more internal (i.e., enterprise) systems 300 are operatively coupled, via a distributed computing network 110, to one or more user computer systems 200, one or more entity (i.e., third-party) systems 600, one or more external data source systems 400 and/or one or more other systems 500. In this way, entities may be analyzed for security threat levels using both external and internal data, and analytics may be utilized to improve the analysis of the third-parties for security threat levels, as will be described throughout the disclosure.

The one or more internal/enterprise systems 300 may allow associated users 201 to perform information security threat assessments of entities (e.g., the third-parties themselves, third-party systems, and/or third-party applications) and/or utilize analytics and machine learning related to the information security threat assessments to improve upon the information security threat assessments. The one or more internal/enterprise systems 300 may allow for the performance of these tasks through communication with the one or more user computer systems 200, the one or more entity/third-party systems 600, the one or more external data source systems 400, and/or the one or more other systems 500 via network 110. Distributed computing network 110 may include both a publicly-accessible portion (e.g., Internet) and a privately-accessible portion (e.g., intranet). As such, distributed computing network 110 may be a global area network (GAN), such as the Internet, a wide area network (WAN), a local area network (LAN), or any other type of network or combination of networks. Additionally, distributed computing network 110 may be configured to provide for wireline, wireless, or a combination of wireline and wireless communication between systems, services, components, and/or devices on the distributed computing network 110.

As illustrated in FIG. 4, the one or more internal/enterprise systems 300 generally comprise one or more communication components 302, one or more processing components 304, and one or more memory components 306. The one or more processing components 304 are operatively coupled to the one or more communication components 302 and the one or more memory components 316. As used herein, the term "processing component" generally includes circuitry used for implementing the communication and/or logic functions of a particular system. For example, a processing component 304 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 304 may include functionality to operate one or more software programs based on computer-readable instructions 308 thereof, which may be stored in the one or more memory components 306.

The one or more processing components 304 implement the one or more communication components 302 to communicate with the distributed computing network 110 and other components on the distributed computing network 110, such as, but not limited to, the components of the one or more user systems 200, the one or more entity/third-party systems 600, the one or more external data source systems 400, and/or the one or more other systems 500. As such, the one or more communication components 302 generally comprise a wireless transceiver, modem, server, electrical connection, electrical circuit, or other component for communicating with other components on the network 302. The one or more communication components 302 may further include an interface that accepts one or more network interface cards, ports for connection of network components, Universal Serial Bus (USB) connectors and the like.

As further illustrated in FIG. 4, the one or more internal/enterprise systems 300 include computer-readable instructions 308 stored in the memory component 306, which in one embodiment includes the computer-readable instructions 308 of the one or more internal/enterprise applications 310 (e.g., website applications, dedicated applications, internal applications, or the like). In some embodiments, the one or more memory components 306 include one or more datastores 320 for storing data related to the one or more internal/enterprise systems 300, including, but not limited to, data created, accessed, and/or used by the one or more internal/enterprise applications 310. The one or more internal/enterprise applications 310 may be utilized to identify internal data related to entities/third-parties, capture external data from one or more external data sources, perform security threat assessments on the third-parties, and utilize analytics to improve upon the security threat assessments.

As illustrated in FIG. 4, one or more user computer systems 200 are utilized by users 201 to access the one or more internal/enterprise systems 300, the one or more entity/third-party systems 600, the one or more external data source systems 400, and/or one or more other systems 500 to facilitate users 201 reviewing the information security threats of entities/third-parties and/or the analytics associated therewith. It should be understood that the one or more user computer systems 200 may be a desktop, mobile device (e.g., laptop, smartphone device, PDA, tablet, or other mobile device), or any other type of computing device that generally include one or more communication components, one or more processing components, and one or more memory components. The one or more user computer systems 200 may generally include one or more communication components 202, one or more processing components 204, and one or more memory components 206. The one or more processing components 204 may include functionality to operate one or more software programs based on computer-readable instructions 208 thereof, which may be stored in the one or more memory components 206.

The one or more processing components 204 are operatively coupled to the one or more communication components 202 and the one or more memory components 206. The one or more processing components 204 use the one or more communication components 202 to communicate with the distributed computing network 110 and other components on the distributed computing network 110, such as, but not limited to, the one or more internal/enterprise systems 300, the one or more entity/third-party systems 600, the one or more external data sources 400, and/or the one or more other systems 500. As such, the one or more communication components 202 generally comprise a wireless transceiver, modem, server, electrical connection, or other component for communicating with other components on the distributed computing network 110. The one or more communication components 202 may further include an interface that accepts one or more network interface cards, ports for connection of network components, Universal Serial Bus (USB) connectors and the like. Moreover, the one or more communication components may include a keypad, keyboard, touch-screen, touchpad, microphone, mouse, joystick, other pointer component, button, soft key, and/or other input/output component(s) for communicating with the other systems.

As illustrated in FIG. 4, the one or more user computer systems 200 may have computer-readable instructions 208 stored in the one or more memory components 206, which in one embodiment includes the computer-readable instructions 208 for one or more user applications 210, such as dedicated applications (e.g., apps, applets, or the like), portions of dedicated applications, websites, or other apps that allow the users 201 to take various actions, including allowing the users 201 to access applications located on other systems, or the like, to perform steps and/or review the results of the processes discussed herein. In some embodiments, the one or more users 201 utilize the one or more user computer systems 200 to communicate with the one or more internal/enterprise systems 300, the one or more entity/third-party systems 600, and/or the one or more external data source systems 400 in order to allow the one or more users 202 to determine information security threat levels of entities/third-parties and/or determine analytics thereof utilizing a security threat level module and/or an analytics module.

As illustrated in FIG. 4, one or more entity/third-party systems 600 may communicate with the one or more internal/enterprise systems 300, the one or more user computer systems 200, the one or more external data source systems 400, and/or the one or more other systems 500 in order allow for access to external assessment information. As such, the one or more entity third-party systems 600 are operatively coupled, via distributed computing network 110, to the one or more internal/enterprise systems 300, the one or more user computer systems 200, the one or more external data source systems 400, and/or the one or more other systems 500. The one or more entity/third-party systems 600 generally include one or more communication components 602, one or more processing components 604, and one or more memory components 606. The one or more processing components 604 are operatively coupled to the one or more communication components 602, and the one or more memory components 606. The one or more processing components 604 implement the one or more communication components 604 to communicate with distributed computing network 110 and other components on the network 110, such as, but not limited to, the components of the one or more internal/enterprise systems 300, the one or more user computer systems 200, the one or more external data source systems 400, and/or the one or more other systems 500. As such, the one or more communication components 602 generally include a wireless transceiver, modem, server, electrical connection, or other component for communicating with other components on the distributed computing network 110. The one or more communication components 602 may further include an interface that accepts one or more network interface cards, ports for connection of network components, Universal Serial Bus (USB) connectors and the like.

As illustrated in FIG. 4, the one or more entity/third-party systems 600 may have computer-readable instructions 608 stored in the one or more memory components 606, which in one embodiment includes the computer-readable instructions 608 of one or more entity/third-party applications 610, such as dedicated applications (e.g., apps, applet, or the like), portions of dedicated applications, websites, or other apps that allow for communication with the one or more users 201 and/or the enterprise regarding the services (e.g., applications, systems, or the like) that the entity/third-parties may provide to the enterprise, as will be described herein. It should be understood, when entity/third-party is used herein, unless otherwise specified, the entity/third-party may include the entity/third-party itself, the systems and applications offered by the entity/third-party, the external source systems or applications utilized by the entity/third-party, and/or other entity/third-party information.

Moreover, as illustrated in FIG. 4, the one or more external data source systems 400 and/or the one or more other systems 500 may be operatively coupled to the one or more internal/enterprise systems 300, the one or more user computer systems 200, and/or the one or more entity/third-party systems 602, via the distributed computing network 110. The one or more external data source systems 400 and/or the one or more other systems 500 have components the same as or similar to the components described with respect to the one or more internal/enterprise systems 300, the one or more user computer systems 200, and/or the one or more third-party systems 600 (e.g., one or more communication components, one or more processing components, and one or more memory devices with computer-readable instructions of one or more applications, one or more datastores, or the like). The one or more external data source systems 400 may provide external data, such as security threat information, third-party assessment data, third-party security threat levels, or the like to the enterprise to aid in providing data for the security threat assessment conducted by the entity. Thus, the one or more external data source systems 400 and/or the one or more other systems 500 communicate with the one or more internal/enterprise systems 300, the one or more user computer systems 200, and/or the one or more entity/third-party systems 600 in same or similar way as previously described with respect to the one or more internal/enterprise systems 300, the one or more user computer systems 200, and/or the one or more entity/third-party systems 600.

Figure 5:
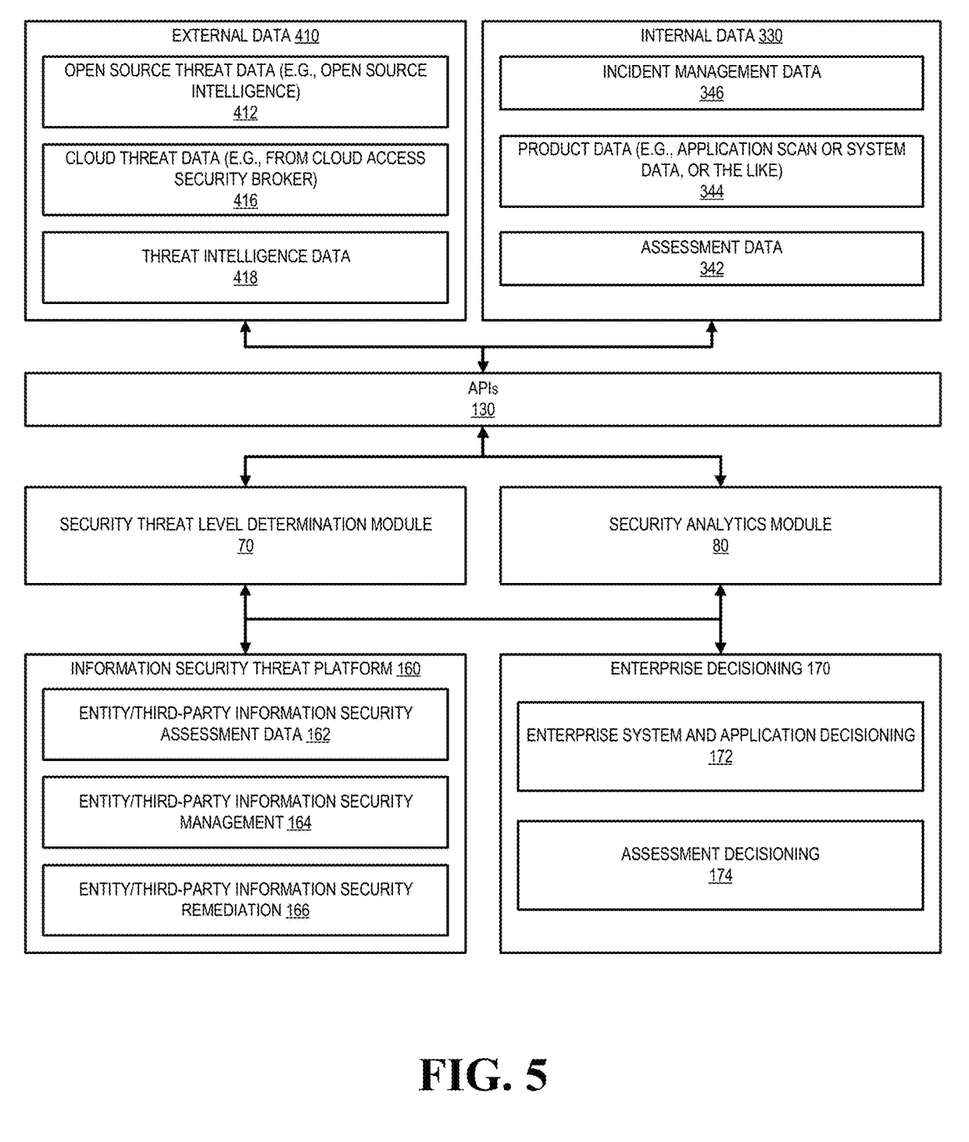
FIG. 5 illustrates a flow of information to and from the security threat assessment engine and the analytics engine, in accordance with embodiments of the invention.

FIG. 5 provides a block diagram illustrating the flow of information through the various systems that are utilized to develop and use the security threat level determination module 70 and/or the security analytics module 80. Specifically, FIG. 5 illustrates a process flow for utilizing a security threat level determination module 70, in accordance with embodiments of the invention. A security threat level determination module is configured to assess security threats of third-parties, such as the third-party products (e.g., goods and services) that the enterprise utilizes from the entities/third-parties within the systems and/or applications of the enterprise hosted by the entity/third-party. For example, the enterprise may utilize processes, systems, and/or applications of the entity/third-party (e.g., that the entity/third-party hosts or that are provided to the entity for installation), such as applications (e.g., programs, processes, or the like) and/or systems (e.g., storage, devices, components, or the like), which may or may not have access to and/or store confidential information (e.g., user information, business information, monetary information, or the like) of the entity and/or customers of the entity. In some instances the enterprise may utilize thousands of products from various entities/third-parties. The security threat level determination module 70 is configured to identify potential security threats, such as by identifying particular security threats associated with an entity/third-party (e.g., individual third-party security threats) and/or determining one or more security threat levels for the third-party (e.g., an overall assessment of the security threat of the third-party).

As illustrated, in FIG. 5 the security threat level determination module 70 relies on external data 410 it retrieves or receives from external sources (e.g., an external data source system 400) and/or internal data 330 captured from within the internal/enterprise systems 300, in order to identify one or more security threats from each of the entities/third-parties. The external data 410 and the internal data 330 may be received through one or more Application programming interfaces (APIs) 130, which allows the external data source systems 400 and/or the internal/enterprise systems 3000, and the applications and systems associated therewith, to interact with the security threat level determination module 70 and/or the security analytics module 80, through different systems and/or applications. The security threat level determination module 70 and/or the security analytics module 80 may be utilized to develop and deploy third-party information security controls through an information threat security platform 160 and/or to improve entity decisioning in an entity deaccessioning platform 170.

It should be understood that the external data 410 may include different types of external third-party threat data, such as open source threat data 412, cloud threat data 416, and threat intelligence data 418, or the like. The open source threat data 412 (e.g., open source intelligence ("OSINT") data) may include various data that is monitored by an external data source. For example, the open source data may be a summary threat level of entities/third-parties based on the information that the external data source has on the entities/third-parties. The open source data 412 may be based on a category type of the entities/third-parties (e.g., type of business in which the third-party is involved), such as the products that the entities/third-parties offer and the information to which the entities/third-parties have access. The open source data 412 may further include remediation data, such as how potential threats dealt with by the entity/third-party. The cloud threat data 416 (e.g., a cloud access security broker ("CASB") data) may be similar to the type of data associated with the open source threat data 412, but it may be specific to data related to the cloud services that the entities/third-parties may utilize. As such, the cloud threat data 416 may include summary security threat levels of the entities/third-parties for the cloud related activities, a category type associated with the cloud related activities, and/or remediation data associated with the cloud related activities. The open source threat data 412 and cloud threat data 416 may be identified and utilized separately because different enterprises may provide the associated products and each may have different security threats associated therewith.

The external data 410 may also include threat intelligence data 418, which may relate to publicly available information, such as news, trade information, or other publicly accessed information that may indicate potential security threats associated with particular third-parties.

It should be understood that the external data 410 received from the external data source systems 400 may be information to which the enterprise currently does not have access. For example, the external data source systems 400 may monitor communications over the Internet with the entities/third-parties, and thus, the external data source systems 400 may monitor the number of communications with the entities/third-parties, the type of communications, requests within the communications (e.g., required authentication, number of authentication factors or the like). Additionally, the external data sources 410 may have access to other information regarding incidents, assessments, or the like that the entity does not have, and thus, may provide a different view of the security threats associated with the entities/third-parties. Moreover, different external data sources may have different information about entities/third-parties, and thus, it may be beneficial to access external data 410 from different external data sources. For example, one external data source may define one entity/third-party as having a security threat level that is low, while another external data source may define the same entity/third-party as having a security threat level that is high because it has access to incident data that the first entity/third-party many not have.

The internal data 330 may include incident/event management data 346, which is related to any incidents that may be associated with a system and/or application provided by the entity/third-party that is utilized by the enterprise (e.g., hosted by the entity/third-party and/or hosted by the enterprise). For example, the incident/event may be an actual security event, such as misappropriated data, exposure of confidential information, successful unauthorized access by another party (e.g., other than the entity/third-party or the enterprise), or other like incident that could have resulted in an actual security event (e.g., unsuccessful unauthorized access attempt, or the like). The internal data 330 may further include application and/or system data 344, which is related to the operation and/or use of the applications and/or systems of the entities/third-parties. For example, the application and/or system data 344 may include how the application and/or system is utilized within the enterprise, such as what information is stored (e.g., anonymous information, personal information), how the application and/or system operates (e.g., how the information is stored, how a user accesses the information), what other applications and/or systems communicate with the entity/third-party applications and/or systems (e.g., how many different ways is the information accessed and/or distributed). Product data may additional includes results of application scans and the like. The internal data 330 may further include assessment data 342, which relates to different types of assessments that were performed on the entity/third-party (e.g., the entity/third-party itself, the entity/third-party processes, the entity/third-party applications, and/or the entity/third-party systems). Different types of assessments may include self-assessments provided by the entity/third-party to the enterprise, online assessments (e.g., questionnaires) provided by the enterprise to the entity/third-party, and/or onsite assessments for which a user 201 associated with the enterprise physically contacts the entity/third-party to review the entity/third-party processes, applications, and/or systems. The assessment data 342 may further include a frequency of assessments indicating how often an entity/third-party should be assessed and what type of assessment should be used (e.g., onsite assessment once a year and online assessments three times a year, or the like).

As illustrated in FIG. 5, the security threat level determination module 70 and/or the security analytics module 80 may be utilized for the enterprise's information security threat platform 160 and/or the enterprise decisioning platform 170. For example, as previously discussed herein, the security threat level determination module 70 and/or security analytics module 80 may be utilized to provide third-party information security assessment data 162 (e.g., assessment data, security threats, and/or security threat levels for various entities/third-parties), to provide entity/third-party information security management 164 (e.g., determine the security controls to require for particular entities/third-parties and the associated applications and/or systems), and/or to provide entity/third-party information security remediation (e.g., remediation planning should a security threat result in an actual incident). Moreover, as previously discussed herein, the security threat level determination module 70 and/or security analytics module 80 may be utilized to provide third-party decisioning 172 (e.g., what applications and/or systems to utilize from what entities/third-parties based on the potential security threats of each), and/or to provide assessment decisioning 174 (e.g., the assessment type and/or assessment frequency for the entities/third-parties).

It should be understood that the assessments and/or the determination of the security threats may result in the implementation of security controls. As such, the results of the assessments may provide information on whether or not various security controls require implementing. As such, the assessment may relate to and/or result in security controls for implementing a business recovery plan (e.g., actions to take in response to a security threat) and/or a technical recovery plan (e.g., technical actions to take in response to a security threat); mitigating potential security threats associated with the entity/third-party use of external functions (e.g., security around use of external source applications and/or systems); recovery time requirements in place for various levels of incidents (e.g., essential incidents corrected in 8 hours, non-essential incidents corrected in one week); perform business impact analysis of potential security threats (e.g., how incidents will affect the business); back up plans are tested regularly (e.g., regular verification of backup systems and/or applications); formal change management procedures are outlined for any application or system changes (e.g., logging of application and/or system changes); remote access is properly encrypted; relevant internal and external communications use of an approved proxy service; monitoring of the electronic communications for confidential information of the entity; monitoring and controlling write privileges to external drives; the devices within the business include anti-virus technology; employee access privileges are routinely checked and monitored; access to physical secure servers is monitored by surveillance; testing is not performed using live data; enterprise data separated from other party data; access to data requires multifactor authentication; password requirements are instituted; encryption access is split to require multiple people in order to access such information; monitoring of security log information occurs; and/or the like.

It should be further understood that in some embodiments of the invention the security threat level described herein may include a ranking of the entity/third-party with respect potential security threats. In embodiments of the invention, the ranking may include a general ranking (e.g., high, medium, low, or the like), a specific score, or the like. In some embodiments a score may be based on the external data 410 and the internal data 330. In some embodiments the score may be a measurement of the likelihood of having a security threat event and/or the likely loss from occurrence of a security threat event. In some embodiments, the score may be based on scoring of the weighted factors of the external data 410 and the internal data 330.

It should be understood that in some embodiments of the present invention traditional security threat systems is improved by not only utilizing internal data regarding applications and/or systems of entities/third-parties, but also by accessing external data from outside data sources in order to supplement the internal data that is available to the entity. The integration of the internal and external data is utilized to more accurately identify potential security threats of an entity third-party that may supply products to the entity. The present invention also is able to predict how likely the security threats identified will result in an incident in the future (e.g., within the weeks, months, years, or the like). Moreover, the determination of the security threats helps the entity to determine plans for mitigating and/or eliminating the security threats by implementing security controls. Furthermore, continuous monitoring of the security threats (e.g., based on continuous monitoring of the external and/or internal data) allows the entity to make decisions regarding how to mitigate potential incidents and/or whether or not to take specific actions with respect to third-parties. For example, as the external data and/or internal data changes, which may result in the identification and/or removal of security threats for different third-parties, the present invention may automatically take actions with respect to the third-party. For example, when a security threat and/or specific incident is identified, the present invention may automatically prevent access to and/or use of the applications and/or system for which the security threat was identified. In other embodiments, the present invention may automatically implement security controls for the application and/or system. As such, the present invention allows for real-time management of security threats and implementation of security controls in order to prevent potential incidents (e.g., misappropriation of data by compromising entities, loss of confidential information, or the like). The present invention is an improvement over traditional systems because of the use of the external data, and the real-time monitoring of the security threats, which results in more accurate determination of security threats and more efficient mitigation of such security threats.

It should be further understood that changes in the external data and internal data, as well as the resulting changes in the security threats, may be monitored over time in order to improve upon the accuracy of the determination of the security threats. For example, the monitoring may allow for the determination of patterns in the accuracy of identifying security threats that results in the reduction of the occurrence of incidents. Moreover, the monitoring may help to determine patterns in the correlation between the individual assessment inquires related to the security threats with the actual incidents in order to determine if the right assessment inquiries are being made and the right security controls are being implemented. The present invention may also be utilized to examine the assessments of various assessors in order to determine if particular assessors are good at identifying some security threats, but not others, in order to improve training for the assessors (e.g., for types of security assessment, the assessment process, or the like), shifting assessors to assessing different entities/third-parties, and/or to updating the assessments inquiries.

Thus, as described above, embodiments of the present invention provides for generating a set of entity-specific security-related inquiries and determining the frequency for presenting the inquiries based at least on both external data and internal data. As such, according to embodiments herein described in detail below, a set of inquiries are generated that are specific to the entity, such that, inquiries can be tailored for an entity based on the entity's security threat level (i.e., likelihood of occurrence of a security event and/or likely loss from occurrence of a security threat), as well as, other factors, such as type of entity, types of applications provided by hosted by the entity, volume of applications provided by or hosted by the entity and the like. As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 7669US1.014033.3125 | 15/827,094 published as U.S. Patent Publication No. 2019/0166154 | SYSTEM FOR INFORMATION SECURITY THREAT ASSESSMENT BASED ON DATA HISTORY | Nov. 30, 2017 |
| 8111US1.014033.3128 | 15/827,292 published as U.S. Patent Publication No. 2019/0166155 | SYSTEM FOR GENERATING A COMMUNICATION PATHWAY FOR THIRD PARTY VULNERABILITY MANAGEMENT | Nov. 30, 2017 |
| 8112US1.014033.3127 | 15/826,979 published as | INFORMATION SECURITY VULNERABILITY | Nov. 30, 2017 |

-continued

| Docket Number | U.S. Patent Application Ser. No. | Title | Filed On |
|---|---|---|---|
| | U.S. Patent Publication No. 2019/0166153 | ASSESSMENT SYSTEM | |
| 8132US1.014033.3133 | 15/826,893 published as U.S. Patent Publication No. 2019/0166152 | SYSTEM FOR INFORMATION SECURITY THREAT ASSESSMENT | Nov. 30, 2017 |
| 8135US1.014033.3134 | 15/827,515 published as U.S. Patent Publication No. 2019/0163916 | DATA INTEGRATION SYSTEM FOR TRIGGERING ANALYSIS OF CONNECTION OSCILLATIONS | Nov. 30, 2017 |
| 8136US1.014033.3135 | 15/827,034 published as U.S. Patent Publication No. 2019/0163914 | SYSTEM FOR INFORMATION SECURITY THREAT ASSESSMENT AND EVENT TRIGGERING | Nov. 30, 2017 |
| 8138US1.014033.3136 | 15/827,097 published as U.S. Patent Publication No. 2019/0163915 | SYSTEM FOR RECURRING INFORMATION SECURITY THREAT ASSESSMENT | Nov. 30, 2017 |

The invention claimed is:

1. A system for determining security-related inquiries and inquiry frequency, the system comprising:
   a computer platform having a memory and at least processor in communication with the memory;
   an external data retrieval module stored in the memory, executable by the processor and configured to retrieve, from one or more external data sources via a publicly-accessible portion of a distributed computing network, security-related external data associated with an entity, wherein the security-related external data comprises public open source intelligence data;
   an internal data reception module stored in the memory, executable by the processor and configured to receive, from one or more internal data sources via a privately-accessible portion of the distributed computing network, security-related internal data associated with the entity;
   a security analytics module stored in the memory, executable by the processor and configured to apply logic to the security-related external data and the security-related internal data to identify one or more security related data patterns associated with the entity;
   an inquiry generator module stored in the memory, executable by the processor and configured to generate a plurality of security-related inquiries requesting input parameters, wherein the plurality of inquiries are generated specific to the entity based at least on (i) the security-related external data, (ii) the security-related internal data and (iii) the one or more security-related data patterns associated with the entity; and
   an inquiry frequency determination module stored in the memory, executable by the processor and configured to determine a frequency for invoking the plurality of inquiries to the entity based at least on the security-related external data and the security-related internal data.

2. The system of claim 1, further comprising an inquiry platform module stored in the memory, executable by the processor and configured to present, via the publicly-accessible portion of the distributed computing network, the plurality of security-related inquiries to the entity, request the input parameters for the plurality of security-related inquiries, and receive, via the publicly-accessible portion of the distributed computing network, the input parameters from the entity.

3. The system of claim 2, wherein (i) the inquiry generator module is further configured to generate the plurality of security-related inquiries dynamically in response to the external data retrieval module and the internal data reception module dynamically retrieving and receiving the security-related external data and the security-related internal data in response to updates in one or more of the external data sources or one or more of the internal data sources and (ii) the inquiry platform is configured to dynamically present the plurality of security-related inquiries to the entity in response to dynamically generating the plurality of security-related inquiries.

4. The system of claim 1, wherein the inquiry generator module is further configured to determine one or more security areas of focus based on the security-related external data and the security-related internal data and generate the plurality of security-related inquiries based further on the one or more security area of focus.

5. The system of claim 1, further comprising a security threat level determination module stored in the memory, executable by the processor and configured to determine a security threat level for the entity based on the security-related external data and the security-related internal data.

6. The system of claim 5, wherein the a security threat level determination module is further configured to determine the security threat level for the entity, wherein the security threat level indicates at least one a likelihood of an occurrence of a security event or a likely loss associated with the occurrence of a security event.

7. The system of claim 5, wherein the inquiry generator module is triggered to generate the plurality of security-related inquiries based on the security threat level determination module determining the security threat level.

8. The system of claim 5, wherein the inquiry generator module is further configured to determine the plurality of security-related inquiries by identifying security components of the security threat level, identifying inquiries that are associated with security components and including the identified inquiries in the plurality of security-related inquiries.

9. The system of claim 4, wherein the inquiry frequency determination module is triggered to assess the frequency for presenting the plurality of security-related inquiries based on the security threat level determination module determining the security threat level.

10. The system of claim 4, wherein the inquiry frequency determination module is further configured to determine the frequency for presenting the plurality of security-related inquiries based further on the determined security threat level.

11. The system of claim 1, wherein the security-related internal data associated with the entity comprises at least one of (i) assessment results, (ii) application scan results, and (iii) incident management results.

12. The system of claim 1, wherein the inquiry generator module is further configured to generate the plurality of security-related inquiries specific to the entity based further on at least one of entity type, product or service type providing by the entity, type of data hosted by the entity, amount of data hosted by the entity, volume of applications hosted by the entity.

13. The system of claim 1, wherein the inquiry frequency determination module is further configured to determine the frequency for presenting the plurality of security-related inquiries to the entity based further on at least one of entity type, product or service type providing by the entity, type of data hosted by the entity, amount of data hosted by the entity, volume of applications hosted by the entity.

14. A computer processor-implemented method for determining security-related inquiries and inquiry frequency, the method comprising:
  retrieving, from one or more external data sources via a publicly-accessible portion of a distributed computing network, security-related external data associated with the entity, wherein the security-related external data comprises public open source intelligence data
  receiving, from one or more internal data sources via a privately-accessible portion of the distributed computing network, security-related internal data associated with the entity;
  applying logic to the security-related external data and the security-related internal data to identify one or more security related data patterns associated with the entity;
  generating, by a computing device processor, a plurality of security-related inquiries requesting input parameters, wherein the plurality of inquiries are generated specific to the entity based at least on (i) the security-related external data, (ii) the security-related internal data and (iii) the one or more security-related data patterns associated with the entity; and
  determining, by a computing device processor, a frequency for invoking the plurality of inquiries based at least on the security-related external data and the security-related internal data.

15. The method of claim 14, wherein generating further comprises dynamically generating the plurality of security-related inquiries in response to dynamically retrieving and receiving the security-related external data and the security-related internal data in response to updates in one or more of the external data sources or one or more of the internal data sources.

16. The method of claim 14, further comprising determining one or more security areas of focus based on the security-related external data and the security-related internal data and generating the plurality of security-related inquiries based further on the one or more security area of focus.

17. A computer program product, comprising:
  a non-transitory computer-readable medium comprising codes for causing a computing device processor to:
  retrieve, from one or more external data sources via a publicly-accessible portion of a distributed computing network, security-related external data associated with the entity, wherein the security-related external data comprises public open source intelligence data;
  receive, from one or more internal data sources via a privately-accessible portion of the distributed computing network, security-related internal data associated with the entity;
  apply logic to the security-related external data and the security-related internal data to identify one or more security related data patterns associated with the entity;
  generate a plurality of security-related inquiries requesting input parameters, wherein the plurality of inquiries are generated specific to the entity based at least on (i) the security-related external data, (ii) the security-related internal data and (iii) the one or more security-related data patterns associated with the entity; and
  determine a frequency for invoking the plurality of inquiries based at least on the security-related external data and the security-related internal data.

18. The computer program product of claim 17, wherein the codes for causing the computing device processor to generate further comprise codes for causing the computer device processor to dynamically generate the plurality of security-related inquiries in response to dynamically retrieving and receiving the security-related external data and the security-related internal data in response to updates in one or more of the external data sources or one or more of the internal data sources.

19. The computer program product of claim 17, further comprising codes for causing the computing device processor to determine one or more security areas of focus based on the security-related external data and the security-related internal data and generating the plurality of security-related inquiries based further on the one or more security area of focus.

* * * * *